United States Patent [19]

Ikehara

[11] Patent Number: 5,213,640
[45] Date of Patent: May 25, 1993

[54] RUBBER ARTICLE-REINFORCING 2+8 STEEL CORDS AND PNEUMATIC TIRES USING SUCH STEEL CORDS

[75] Inventor: Kiyoshi Ikehara, Chofu, Japan

[73] Assignee: Bridgestone Corporation, Tokyo, Japan

[21] Appl. No.: 632,607

[22] Filed: Dec. 27, 1990

Related U.S. Application Data

[63] Continuation of Ser. No. 447,464, Dec. 7, 1989, abandoned.

[30] Foreign Application Priority Data

Dec. 7, 1988 [JP] Japan .................. 63-307690

[51] Int. Cl.$^5$ .......................... B60C 9/18; B60C 9/20; D07B 1/08
[52] U.S. Cl. ..................... 152/451; 57/902; 152/527
[58] Field of Search ............ 152/451, 527, 556; 57/902

[56] References Cited

U.S. PATENT DOCUMENTS

| | | | |
|---|---|---|---|
| 4,349,063 | 9/1982 | Kikuchi et al. | 152/359 |
| 4,543,298 | 9/1985 | Riedl | 428/592 |
| 4,690,191 | 9/1987 | Kawasaki | 152/527 |
| 4,732,197 | 3/1988 | Heishi et al. | 152/451 |
| 4,783,955 | 11/1988 | Uchio | 57/213 |
| 4,917,165 | 4/1990 | Umezawa | 152/527 |

FOREIGN PATENT DOCUMENTS 63-2704 1/1988 Japan .................. 152/527

OTHER PUBLICATIONS

"New developments in steel cords for tyres", *International Polymer Science and Technology*, vol. 11, No. 10, 1984, pp. T/53–T/60.

Primary Examiner—Michael W. Ball
Assistant Examiner—Adrienne C. Johnstone
Attorney, Agent, or Firm—Sughrue, Mion, Zinn, Macpeak & Seas

[57] ABSTRACT

A steel cord comprising a core and a sheath arranged around the core. The core consists of two steel filaments, and the sheath consists of eight steel filaments. The diameter of each of the filaments is in a range from 0.30 to 0.42 mm, and a difference $D_c - D_s$ between the diameter $D_c$ of the filaments of the core and that $D_s$ of the sheath is not less than 0.04 mm. The twisted direction of the core is the same as that of the sheath, and a ratio $P_s/P_c$ between a pitch $P_s$ of the sheath and that of $P_c$ of the core is in a range from 1.4 to 3.0.

2 Claims, 1 Drawing Sheet

RUBBER ARTICLE-REINFORCING 2+8 STEEL CORDS AND PNEUMATIC TIRES USING SUCH STEEL CORDS

This is a continuation of application No. 07/447,464 filed Dec. 7, 1989 now abandoned.

BACKGROUND OF THE INVENTION

1. Field of the Invention

The present invention relates to steel cords to be used as reinforcements for rubbery articles such as pneumatic tires and industrial belts, and to radial tires having a belt layer composed of such steel cords. The present invention directed particularly to improve durability.

2. Related Art Statement

The rubbery article reinforced with steel cords has a problem in that durability life of the article lowers due to corrosion of steel filaments from water invading it.

For instance, assume that the steel cords used for the belt of the tire have cavities therein. If the tire tread gets an external cut that reaches into the belt, water entering the belt spreads over the cord in a longitudinal direction through the cavity, so that rust formed by water accordingly spread. Consequently, adhesion between the rubber and the steel cord drops at those locations, and a separation phenomenon occurs ultimately.

In order to prevent such a corrosion-propagating phenomenon, a cord construction is proposed, in which rubber can fully penetrate through gaps between adjacent metallic filaments on vulcanizing under pressure.

Japanese Patent Publication Nos. 62-21,641 and 60-49,421 disclose that gaps are provided between filaments of a cord by excessively forming the cord. However, it is difficult to maintain the gaps, so that effects obtained disadvantageously depend upon handling in the tire producing process.

To the contrary, Japanese Utility Model Registration Application Laid-open No. 60-178,204 shows a technique for maintaining gaps between filaments by improving the construction of the cord without relying upon the forming technique. This publication discloses a tire using a belt composed of steel cords each consisting of a core made of two metallic filaments and an outer layer made of six metallic filaments arranged around the core. However, since the cords disclosed are composed of the filaments having a small diameter, it is difficult for such steel cords to assure satisfactory internal pressure-maintaining ability and durability when used for trucks or buses.

That is, it is necessary to increase the number of cords per unit width or the diameter of the cords so as to ensure a sufficient internal pressure-maintaining ability. However, since gaps between the adjacent cords narrow when the number of cords per unit width is increased, belt separation occurs. On the other hand, if the diameter of the cord is increased, strain on the surface of the cord greatly varies on bending, so that buckling fatigue resistance of the cord drops.

SUMMARY OF THE INVENTION

It is an object of the present invention to provide steel cords for reinforcing rubbery articles, particularly, belts of radial tires represented by truck and bus tires, and to improve durability of the cords by enhancing rubber permeability without lowering the buckling resistance of the cords or separation resistance of the belts.

The present inventor has made strenuous studies to solve the above-mentioned problems, and consequently accomplished the present invention through the discovery that durability is advantageously enhanced by burying steel cords having a novel structure into rubber.

That is, the present invention provides rubbery article-reinforcing steel cords each comprising a core and a sheath arranged around the core, wherein the core consists of two steel filaments and the sheath consists of eight steel filaments, the diameter of each of the filaments is in a range from 0.30 to 0.42 mm, a difference $D_c - D_s$ between the diameter $D_c$ of the filaments of the core and that $D_s$ of the filaments of the sheath is not less than 0.04 mm, the twisted direction of the core is the same as that of the sheath, and a ratio $P_s/P_c$ is in a range from 1.4 to 3.0 in which $P_c$ and $P_s$ are pitches of the core and the sheath, respectively.

The present invention also provides pneumatic radial tires each provided with a belt surrounding a radial carcass, wherein the belt layer is composed of the above steel cords.

It is preferable as a practical application that the content of carbon in the steel cord is in a range from 0.80 to 0.85% by weight.

These and other objects, features, and advantages of the invention will be appreciated upon reading of the following description of the invention when taken in conjunction with the attached drawings, with the understanding that some modifications, variations, and changes of the same could be made by the skilled person in the art to which the invention pertains without departing from the spirit of the invention or the scope of claims appended hereto.

BRIEF DESCRIPTION OF THE ATTACHED DRAWING

For a better understanding of the invention, reference is made to the attached drawing wherein:

FIG. 1 is a sectional view of a steel cord according to the present invention.

DETAILED DESCRIPTION OF THE INVENTION

Figure 1:
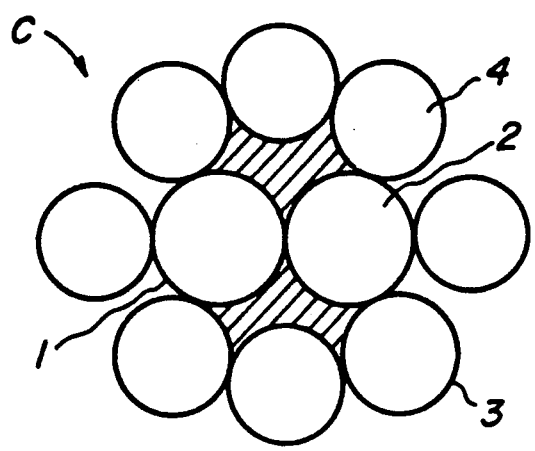

FIG. 1 shows the sectional view of the steel cord C according to the present invention. In FIG. 1, reference numerals 1, 2, 3 and 4 are a core, a filament of the core, a sheath and a filament of the sheath, respectively. Two core filaments having a round section are twisted together to form the core of a cord construction. On the other hand, eight sheath filaments having a round section are spirally twisted around the core. The filaments of the core and the sheath are twisted in the same direction, which affords more excellent fatigue resistance as compared with a reversely twisted cord construction. A ratio $P_s/P_c$ between the pitch $P_s$ of the sheath and the pitch $P_c$ of the core is set at 1.4 to 3.0. Further, a difference $(D_c - D_s)$ between the diameter $D_c$ of the core and that $D_s$ of the sheath is set at not less than 0.04 mm.

The reason why the diameter of the filament is set at 0.30 to 0.42 mm is that if it is more than 0.42 mm, variations in a surface strain on bending become greater to deteriorate fatigue resistance of the cord, while on the other hand, if it is less than 0.30 mm, the cord lacks strength, and an internal pressure-maintaining ability at a high internal pressure, which is required for bus tires, drops.

The reason why the difference $(D_c - D_s)$ in diameter between the core and the sheath, is set at not less than 0.04 mm is that if it is less than 0.04 mm, gaps between the filaments of the sheath are small. Consequently, rubber does not sufficiently penetrate into the cord on vulcanizing under pressure, so that necessary corrosion-propagating resistance cannot be obtained.

Even if the above requirements excluding that for the pitch are met, portions of the cord where no rubber directly penetrates are produced as sectionally shown in FIG. 1 by shadow because the filaments contact each other. However, since the pitch differs between the core and the sheath, the above portions continue to the outside of the cord at locations in a longitudinal direction of the cord. Therefore, rubber can penetrate the entire spaces among the filaments. That is, the rubber can sufficiently penetrate the cord by setting the ratio $P_s/P_c$ between the pitches $P_s$ and $P_c$ of the core and the sheath, respectively, at 1.4 to 3.0. If the ratio is less than 1.4, portions of the cord where no rubber penetrates appear, so that the corrosion-propagating resistance is deteriorated. On the other hand, if the ratio is more than 3.0, it becomes difficult to uniformly cut the cords under tension, and strength of the cords decreases.

In order to obtain strength necessary for maintaining the internal pressure when the diameter of each of the filaments is not more than 0.42 mm, it is preferable to use the cord filaments made of a high tensile steel containing 0.80 to 0.85% by weight of carbon.

EXAMPLES

Nine types of truck or bus radial tires each having a tire size of 10.00 R20 were prepared. Each tire had a belt composed of steel cords given in below Table. With respect to each of the tires, corrosion-propagating resistance, separation resistance, and resistance to flexural fatigue were examined. Results are also shown in the Table.

The corrosion-propagating resistance was evaluated by the following method.

A rubber-coated belt cord was extracted in a length of 100 mm from a tire, and its peripheral surface was covered with a silicone sealant. Then, an end portion of the cord was immersed into a 10% NaOH aqueous solution to make the solution penetrate into the cord through the end only. After 24 hours of immersion, the rubber was picked and peeled by a plier. Assuming that a portion of the cord where a metallic luster was seen was a corrosion-propagated portion, the corrosion-propagating resistance was evaluated by its length (mm).

The separation resistance was evaluated by the following method.

A tire was run on a drum under trailer shaft conditions. After running for a given time, the length of a crack at an end portion of the belt was measured, and its reciprocal was calculated. Results are shown by index by taking that of tire No. 1 as 100.

The resistance to flexural fatigue was evaluated as follows:

The maximum value Emax of variations in strain of the surface of the filament produced when the cord was bent as the tire rides over semi-spherical projections (radius: 126 mm) was determined by the following expression.

$$E_{max} = |E_1 - E_2|$$

$$E_1 = \frac{\sqrt{1 + a_1\tan^2\alpha\{2a_1 - 2 + a_1\tan^2\alpha(1 - a_1)^2\}} \times D_f}{2\gamma[1 + \tan^2\alpha(1 - a_1)^2]}$$

$$E_2 = \frac{\sqrt{1 + a_2\tan^2\alpha\{2a_2 - 2 + a_2\tan^2\alpha(1 - a_2)^2\}} \times D_f}{2r[1 + \tan^2\alpha(1 - a_2)^2]}$$

$\alpha$: filament-twisted angle
$a_1 = r/504$
$a_2 = r/126$
$D_f$: filament diameter
r: diameter of major axis of spiral locus of filament center Results are given by index by taking that of Tire No. 1 as 100.

TABLE 1

|  | 1 | 2 | 3 | 4 | 5 | 6 | 7 | 8 | 9 |
|---|---|---|---|---|---|---|---|---|---|
| Cord construction | 2 + 6 | 2 + 6 | 2 + 6 | 2 + 8 | 2 + 8 | 2 + 8 | 2 + 8 | 2 + 8 | 2 + 8 |
| Core filament $D_c$ (mm) | 0.4 | 0.42 | 0.44 | 0.36 | 0.38 | 0.44 | 0.4 | 0.4 | 0.4 |
| Sheath filament $D_s$ (mm) | 0.4 | 0.42 | 0.44 | 0.36 | 0.35 | 0.39 | 0.34 | 0.34 | 0.36 |
| Filament of outermost layer (mm) | — | — | — | — | — | — | — | — | — |
| Spiral filament (mm) | — | — | — | — | — | — | — | — | — |
| Core-twisting pitch $P_c$ (mm) | 8.0 | 8.0 | 8.0 | 8.0 | 8.0 | 8.0 | 12.0 | 8.0 | 6.0 |
| Sheath-twisting pitch $P_s$ (mm) | 16.0 | 16.0 | 16.0 | 16.0 | 16.0 | 16.0 | 16.0 | 16.0 | 16.0 |
| Pitch of outermost layer (mm) | — | — | — | — | — | — | — | — | — |
| Spiral pitch (mm) | — | — | — | — | — | — | — | — | — |
| Twisting direction | S/S | S/S | S/S | S/S | S/S | S/S | S/S | S/S | S/S |
| Carbon content (wt %) | 0.82 | 0.82 | 0.82 | 0.82 | 0.82 | 0.72 | 0.82 | 0.82 | 0.82 |
| Number of cords/5 cm | 20.5 | 19.2 | 18.0 | 19.1 | 19.4 | 19.8 | 19.7 | 19.8 | 18.5 |
| Separation resistance (index) | 100 | 110 | 121 | 140 | 133 | 104 | 126 | 125 | 140 |
| Resistance to flexural fatigue (index) | 100 | 96 | 92 | 110 | 104 | 92 | 96 | 100 | 106 |
| Resistance to corrosion propagation (mm) | 10 | 10 | 10 | 80 | 50 | 15 | 80 | 10 | 10 |
| Remarks | Comparative Example | | | | | | | Example | |

According to the present invention, corrosion-propagating resistance, separation resistance, and resistance to flexural fatigue of the steel cord are improved. Thus, durability of the tire using such steel cords is improved to greatly prolong the use life.

What is claimed is:

1. A pneumatic radial truck or bus tire comprising a carcass containing radially arranged cords, and a belt surrounding the carcass, said belt being composed of steel cords each comprising a core and a sheath around the core, said core consisting of two steel filaments, said sheath consisting of eight steel filaments, wherein a diameter of each of the filaments is in a range from 0.30 to 0.42 mm, a difference $D_c - D_s$ between the diameter $D_c$ of the filaments of the core and that $D_s$ of the sheath is not less than 0.4 mm, a twisted direction of the core is the same as that of the sheath, and a ratio $P_s/P_c$ between a pitch $P_s$ of the sheath and that $P_c$ of the core is in a range from 1.4 to 3.0.

2. The pneumatic radial tire according to claim 1, wherein a content of carbon in the steel cords is in a range from 0.80 to 0.85% by weight.

* * * * *